Sept. 17, 1957 R. T. JOSEPH ET AL 2,806,837
TERPENE POLYMER-BENZOID RESIN AND PROCESS OF MAKING SAME
Filed April 14, 1954
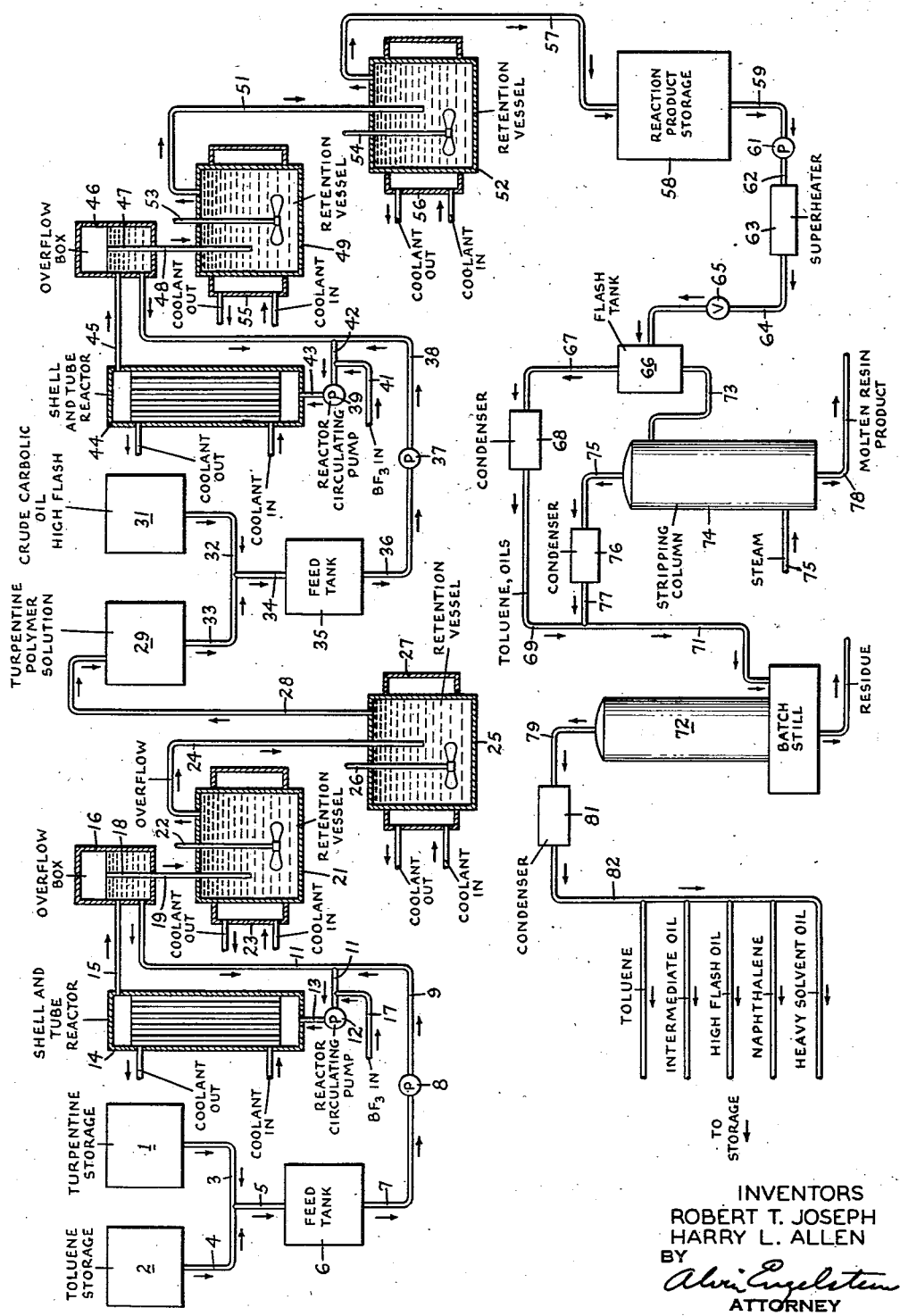
INVENTORS
ROBERT T. JOSEPH
HARRY L. ALLEN
BY
ATTORNEY 2,806,837
Patented Sept. 17, 1957

2,806,837

TERPENE POLYMER-BENZOID RESIN AND PROCESS OF MAKING SAME

Robert T. Joseph, Richboro, and Harry L. Allen, Philadelphia, Pa., assignors to Allied Chemical & Dye Corporation, New York, N. Y., a corporation of New York Application April 14, 1954, Serial No. 423,127

6 Claims. (Cl. 260—45.5)

This invention relates to the production of tile grade resins and more particularly refers to a new and improved method of converting terpenes and benzoid polymerizable monomers into a new plasticized binder suitable for use in the manufacture of tile.

In the manufacture of tile various inorganic ingredients such as asbestos, limestone, talc, etc., are bound together with a plasticized binder such as coumaroneindene resin, for example tile grades of "Cumar" resins and stearine pitch. The process is mainly one of hot milling and calendering to a given thickness. In the milling operation, if the blend of resin and pitch is sticky (develops tack), the mill rolls are soon coated and the milled sheet can no longer be removed from the machine. The process shuts down while a long dirty job of cleaning the rolls follows. Thus the necessity of employing a non-tacky plasticized binder will be evident. Another essential property required of the plasticized binder for use in tile manufacture is a high degree of insolubility in mineral oil which in the trade is expressed as 50–80° C. or higher mineral oil solubility based on test Barrett Standard Method No. 295 entitled "Mineral Oil Solubility of Cumar," published December 31, 1947. Other properties of the plasticized binder are a melting point above 100° C. R. & B., generally within the range of 100–115° C. and a color below about C-3 as described by test methods A. S. T. M. E-28-51-T, and Barrett Standard Method No. 50, respectively.

Most of the plasticized binder used in the tile industry is a coumarone-indene type resin because this resin meets specifications particularly with respect to tackiness and oil insolubility and low price. The raw material from which coumarone-indene type resins are derived is primarily a fraction or fractions of pyrogenous hydrocarbon condensate resulting from the destructive distillation of coals or from the pyrolysis of petroleum at high temperature to produce predominantly gas. These pyrogenous hydrocarbon condensate fractions are known in the art as crude Carbolic Oil Hi-Flash, crude light oil Hi-Flash, and crude drip oil Hi-Flash and have a boiling point of roughly between 150 to 200° C. The pyrogenous hydrocarbon condensate fractions contain a considerable percentage of benzoid type monomers particularly indene with a lesser amount of coumarone and usually an even smaller amount of styrene and substituted styrenes. It is the benzoid type monomers which form resins when the pyrogenous hydrocarbon condensate is subjected to polymerizing conditions.

Due to the increasing availability of natural gas and for other reasons, there has been a curtailment of crudes from which coumarone-indene resins are produced. Consequently, there has been a general investigation of low cost hydrocarbon monomers as possible replacement of these crudes but without success. Indeed, in the past twenty years numerous unsuccessful attempts have been made by the turpentine industry to induce the floor tile market to use various forms of polyterpene resins as extenders or replacements for coumarone-indene resins. Polyterpene resins were found to lack desired characteristics, particularly with respect to tackiness and oil solubility thus rendering their usage unsatisfactory to the tile trade.

An aboject of the present invention is to utilize turpentine in the production of tile grade resins.

Another object of the present invention is to provide a new and improved process for converting terpene polymers and benzoid polymerizable monomers into new and useful resins.

A further object of the present invention is to provide new resins having low oil solubilities, low surface tack and other useful properties.

An other object is to provide efficient methods for converting turpentine or fractions thereof and fractions of pyrogenous hydrocarbon condensate into high yields of specification grade resins, particularly for use in tile and floor coverings.

Other objects and advantages will be apparent from the following description and accompany drawing.

Turpentine, an available relatively inexpensive raw material, is composed of a mixture of terpenes, a major component of which is usually alpha pinene, about 60–80%, a lesser amount of beta pinene, roughly about 10–30%, and the remainder generally a mixture of terpenes. Turpentine upon being polymerized in a conventional manner with a Friedel-Crafts catalyst produces a relatively low yield of hard resin having a melting point R. & B. above 100° C. and an oily polymer, principally terpene dimer and trimer. Neither the hard terpene resin nor the oily polymer is suitable as tile resin because of their tackiness and oil solubility. Terpene resin cannot even be substituted in part for tile grade resin as shown by the following results. A good plasticized binder suitable for use in the manufacture of tile is illustrated by 100% "Cumar" resin which has a melting point R. & B. of 115° C.; a color of C-3; an acceptable sensation of tack; and a mineral oil solubility of 85° C. A conventional 100% terpene resin has a melting point R. & B. of 104° C.; a color of C-1; a not acceptable sensation of tack; and a mineral oil solubility of 20° C. maximum. A blend of 40% by weight of this coumarone-indene resin with 60% by weight of terpene resin has a melting point of 98° C.; a color of C-2; a not acceptable sensation of tack; and a mineral oil solubility of 73° C. It will be noted that the sensation of tack and the mineral oil solubility characteristics of terpene resin alone make it totally unsatisfactory for use in the manufacture of tile. The specification for mineral oil solubility for tile resin is about 50–80° C. or higher. The addition of coumarone-indene resin to terpene resin blends in a certain amount of oil resistance; however, the blend composition is too high in adhesive power to be safely employed as a resin in the manufacture of tile.

In a further effort to utilize terpene as a partial substitute for coumarone-indene in the production of satisfactory tile resin, turpentine (terpene monomers) was copolymerized with Carbolic Oil Hi-Flash (coumarone-indene monomers) in the presence of a Friedel-Crafts catalyst. The resultant copolymers had reduced tackiness as compared to terpene resin but the copolymers did not possess the necessary oil resistance since these products were as soluble in mineral oils as a straight terpene.

From the foregoing, it will be evident that terpene resins, products resulting from blending terpene resins with coumarone-indene resins and copolymerization of terpene monomers with benzoid polymerizable monomers do not have the desired properties requisite for tile grade resins.

We discovered a hard tile grade resin meeting all specifications may be produced by first polymerizing a terpene monomer to form a terpene polymer and then reacting the terpene polymer with a benzoid polymerizable monomer. The resultant product is a new resin which exhibits properties different from either terpene polymer, benzoid polymer, blend of terpene polymer and benzoid polymer, and copolymer of terpene monomer with benzoid monomer.

The resin of the present invention may be produced by reacting terpene polymer with indene-coumarone monomer in a proportion of 1–3 parts by weight of turpentine polymer to 1 part by weight coumarone-indene in pyrogenous hydrocarbon condensate. In order words, by the process of the invention readily available low-cost turpentine replaces more than half the scarcer Carbolic Oil Hi-Flash. Further, the monomer utilization, i. e., yield, of the reactants into hard tile grade resin is high, in excess of 70–80%.

More specifically, tile grade resin may be produced by subjecting turpentine at a temperature below about 100° C., preferably admixed with a solvent oil such as benzene and toluene, to the action of a Friedel-Crafts catalyst as for example aluminum chloride, boron trifluoride and their complexes for a sufficient length of time to effect polymerization of the terpene monomers in the turpentine, adding pyrogenous hydrocarbon condensate fractions to the turpentine polymer solution, preferably in the proportion of 1–2 parts turpentine to 1 part by weight pyrogenous hydrocarbon condensate fractions, maintaining the mixture in the presence of a Friedel-Crafts catalyst, preferably boron trifluoride, at a temperature below 100° C. for a sufficient length of time to effect copolymerization of the turpentine polymer with the indene-coumarone in the pyrogenous hydrocarbon condensate, and recovering a tile grade resin from the reaction mixture.

The polymerization of turpentine to produce polymer may be accomplished in several ways: In a batch type of operation turpentine may be charged into a conventional kettle equipped with a stirrer and surrounded by a jacket through which coolant passes. A solvent such as toluene and benzene is preferably added usually in an amount of from 0.5 to 2 volumes per volume of turpentine. Anhydrous aluminium chloride in an amount of 5–10% by weight of the turpentine is gradually added to the turpentine in the kettle and the mixture agitated for about 6 hours until the terpene monomers are converted into polymers. The turpentine polymer solution is now ready for reaction with coumarone-indene monomer as will be described later. If desired, unreacted light oils may be distilled from the turpentine polymer solution prior to admixture with indene-coumarone.

In another batch method of operation, turpentine in a kettle is brought to the desired temperature and boron trifluoride gas or etherate is added beneath the surface. The quantity of catalyst necessary is approximately 0.5%. This reaction is allowed to continue with vigorous agitation until addition of catalyst causes no further temperature increase. The reaction is held at a selected temperature, desirably within the range of 0–50° C. for about 30 minutes. After this first stage reaction is complete, the light, front end reaction products, usually less than 10% of the volume, may or may not be distilled away. The turpentine polymer is then ready for reaction with Carbolic Oil Hi-Flash.

In a third method, continuous in operation, for effecting polymerization of turpentine to produce a terpene polymer for reaction with indene-coumarone monomer, turpentine is fed into the top of a column filled with packing, such as Berl saddles, countercurrent to $BF_3$ gas introduced into the column. The temperature maintained in the column is below about 100° C., preferably between about 90–100° C. and the feed to the column and length of column are correlated to give a residence time in the column of about 20 minutes. Turpentine polymer is drawn off from the bottom of the column and a small quantity of $BF_3$ gas escapes from the top. The turpentine polymer, either with or without distillation to remove the front end by-products, may then be reacted with Carbolic Oil Hi-Flash.

A fourth method for effecting polymerization of turpentine is described in co-pending application Serial No. 402,546, filed January 6, 1954, involving continuously circulating a mixture of turpentine and organic solvent in the presence of a Friedel-Crafts catalyst and continuously withdrawing turpentine polymer which may then be subjected to further reaction with indene-coumarone monomer.

In the second stage operation the terpene polymer produced by the first stage operation, as described above, is admixed with a pyrogenous hydrocarbon condensate such as Carbolic Oil Hi-Flash which contains approximately 50–65% benzoid polymerizable monomers, principally indene with lesser amounts of coumarone and styrene type compounds. As used herein the term styrene compound includes both styrene and substituted styrenes. The amount of Carbolic Oil Hi-Flash admixed with the terpene polymer may be varied, preferably the proportion of terpene polymer to benzoid polymerizable monomers is within the range of 1–2:1. The reaction between the terpene polymer and the benzoid polymerizable monomers may be carried out in a batch or continuous manner in equipment similar to that described above in connection with the polymerization of turpentine. Friedel-Crafts reagents, preferably boron trifluoride, may be employed to catalyze the reaction which may be maintained at a temperature from about 0° C. to 100° C. The copolymer resin product may be separated from the reaction products by conventional means such as flashing, stripping and distillation.

The accompanying drawing is a diagrammatic flow sheet illustrating one method of carrying out the present invention. Referring to the drawing, the terpene charging material in storage tank 1 may be turpentine or fractions thereof or a terpene monomer from any other source. Although straight turpentine may be employed as the charging material it is usually desirable to prepare a feed mix of turpentine and a solvent, desirably a liquid aromatic hydrocarbon solvent such as toluene or benzene. The proportion of solvent and turpentine making up the feed mix may be varied considerably. In practice, we have found a mixture of equal parts by weight turpentine and toluene to be satisfactory. Turpentine from storage tank 1 and toluene from storage tank 2 are sent in the desired portion through respective lines 3 and 4 via line 5 into feed tank 6. Feed mix withdrawn through line 7 from the bottom of tank 6 is sent by pump 8 through line 9 into suction line 11 and reactor circulating pump 12. Reactor circulating pump forces the feed mix upwardly through line 13 into the bottom of shell and tube reactor 14. Shell and tube reactor 14 is a vertical vessel having tubes incorporated therein around which coolant, for example a mixture of ethyl alcohol and dry ice at a low temperature, passes in indirect heat exchange with the feed mix flowing upwardly through the tubes thereby effecting rapid efficient dissipation of the exothermic heat of polymerization. The feed mix from the top of shell and tube reactor 14 flows through line 15 into overflow box 16. The circuit is completed by liquid discharging from overflow box 16 through line 11 into the suction side of reactor circulating pump 12. Catalyst, $BF_3$ gas, is continuously introduced through line 17 into the reactor system circuit in an amount of approximately 0.5% by weight of the turpentine. A substantially constant volume of circulating mixture is maintained in the circuit by means of overflow weir 18 through which excess from the reactor system circuit is removed through line 19. The temperature of the circulating mixture passing through shell and tube reactor 14 may be maintained within the range of about 0–100° C. Although higher temperatures produce terpene polymers of a lower melting point, we have found in practice that the higher and lower melting point polymers react with the coumarone-indene monomers in the second stage and therefore it is unnecessary to maintain precise control of temperature in the reactor system circuit. However, temperatures substantially above 100° C. cause decomposition and temperatures substantially below 0° materially increase the cost of refrigeration and therefore it is preferred to operate within the range of 0–100° C., preferably 0–50° C. The residence time of reactants in the circulating system may be of the order of 5–30 minutes. Although the residence time may be extended beyond the 30 minutes, as a practical matter the prolongation of the reaction of the circulating body is not desirable because of the increased cost of circulating the mixture. Further, conversion of the unreacted terpene material may be accomplished more economically in simple, inexpensive equipment such as an ordinary empty vessel 21 equipped with stirrer 22 and jacket 23 through which coolant is passed. Frequently, it is desirable to carry out the retention reaction in more than one vessel in which event overflow from retention vessel 21 passes through line 24 into retention vessel 25, similar in construction to vessel 21 and equipped with stirrer 26 and cooling jacket 27. The temperature in the retention vessels may be 0–100° C. and residence time of reactants of the order of 1–3 hours.

The turpentine polymer solution discharging from retention vessel 25 through line 28 may be directed to storage tank 29 and employed in the second stage of the reaction without further treatment, or to provide a purer product for the second stage reaction which in most cases is unnecessary, the turpentine polymer solution discharging from line 28 may be subjected to distillation to remove about 10% or less of the unreactive light ends.

A pyrogenous hydrocarbon condensate such as crude Carbolic Oil Hi-Flash resulting from the destructive distillation of coal is fed from tank 31 through line 32 and admixed with turpentine polymer solution leaving tank 29 through line 33 in a proportion of approximately 1–2 parts by weight turpentine polymer contained in the solution to 1 part by weight of benzoid polymerizable monomers contained in the crude Carbolic Oil Hi-Flash which latter usually contains 50–65% monomer consisting primarily of indene with lesser amounts of coumarone and styrene compounds. The mixture of terpene polymer solution and crude Carbolic Oil Hi-Flash flows through line 34 into feed tank 35 thence through line 36 to be forced by pump 37 through line 38 into the suction side of reactor circulating pump 39 to be treated in equipment and manner similar to that to which the turpentine was previously subjected. The catalyst, boron trifluoride gas, is introduced in an amount approximately 0.5% by weight of the polymerizable constituents, through line 41 into line 42 on the suction side of reactor circulating pump 39. The reaction mixture is then forced upwardly by pump 39 through line 43 and shell and tube reactor 44 similar in construction to shell and tube reactor 14 and provided with means for passing coolant around the tubes. The circulating reaction mixture flows from the top of reactor 44 through line 45 into overflow box 46 and thence returns to the bottom of reactor 44 via line 42. The temperature of the circulating mixture passing through reactor 44 may be maintained between about 0–100° C., preferably within the range of about 25–60° C. A residence time of the reactants circulating through shell and tube reactor 44 may be varied over a wide range. However, from 5 to 30 minutes will ordinarily be found adequate. The circulating system may be operated at atmospheric or super-atmospheric pressure.

Excess reaction products from overflow box 46 are discharged through weir 47 and line 48 into retention vessel 49 and thence through line 51 into retention vessel 52, which vessels are similar in construction to retention vessels 21 to 25 and also equipped with stirrers 53 and 54 and jackets 55 and 56 through which coolant passes. The reaction products are maintained in vessels 49 and 52 at a temperature between about 0–100° C. for a period of 1–3 hours.

Although the process has been described with particular reference to the production of a copolymer of terpene polymer and benzoid polymerizable monomer for use as a plasticized binder in the manufacture of tile, the copolymers of terpene polymer and benzoid polymerizable monomer may be utilized for other purposes as for example in rubber formulations, protective coatings and adhesives. The proportions of terpene polymer and benzoid polymerizable monomers and process factors will of course be varied to produce a copolymer of terpene polymer and benzoid polymerizable monomer having properties best adapted for the particular use.

Reaction products leaving retention vessel 52 through line 57 are a mixture of desired resin product, toluene solvent and hydrocarbon oils boiling over a wide range which when divided into fractions are termed intermediate oil, Hi-Flash oil, naphthalene and heavy solvent oil. Separation of the reaction products into its fractions may be accomplished by discharging the reaction products collected in storage tank 58 through line 59 and forcing it by means of pump 61 through line 62 and superheater 63 which may be a conventional coil surrounded by superheated steam wherein the reaction products are heated to a temperature of about 180° C. under superatmospheric pressure. The effluent from superheater 63 discharges through line 64 and valve 65 into the flash tank 66 maintained at lower pressure thereby causing the bulk of the hydrocarbon oils to volatilize and pass from the top of flash tank 66 through line 67 thence through condenser 68 with the condensate discharging from line 69 and 71 into match still 72. The bottoms from flash tank 66 are directed through line 73 into conventional stripping column 74 wherein steam is introduced through line 75 in direct contact with the bottoms thereby effecting vaporization of the volatile oils which are released through line 75 from the top of stripping column 74, condensed in condenser 76 and then passed down through lines 77 and 71 into batch still 72. Stripping column 74 and flash tank 66 are desirably operated at low subatmospheric pressure. Molten resin, the desired product, is discharged from the bottom of stripping column 74 through line 78 to storage.

Batch still 72 is a conventional still composed of a fractionating column superimposed on a pot provided with heating means usually a steam coil imbedded in the bottom of the still. The contents of still 72 as is typical in batch operation are gradually heated causing evolution of vapors first of the more volatile constituents and subsequently of the higher boiling components which different fractions are separately collected. As illustrated in the flow diagram the vapors leaving still 72 are released through line 79, condensed in condenser 81 and discharged through line 82. The first fraction is toluene, the second fraction is an intermediate oil, the third fraction is a Hi-Flash oil higher in boiling point than the proceeding fractions, and the next two fractions are naphthalene and heavy solvent oil. The toluene may be recirculated to the process. The other fractions may be employed as solvents in industry or for other purposes.

The following examples illustrate the present invention. Turpentine charged to the process contains approximately 64 weight percent alpha pinene and 25 weight percent beta pinene and has the following boiling range:

| Percent distilled | Temperature, ° C. |
| --- | --- |
| 1st drop | 158.6 |
| 1% | 158.9 |
| 5% | 159.3 |
| 50% | 160.0 |
| 90% | 162.3 |
| 95% | 163.9 |
| 96% | 166.0 |

The other reactant to the process is crude extracted Hi-flash boiling within the range of 150–200° C. and containing approximately 60% benzoid polymerizable monomers which consist principally of indene and coumarone. In all the operations the turpentine polymer ing material is first polymerized to form a terpene polymer and then the terpene polymer copolymerized with the indene-coumarone in the Hi-flash to produce a tile grade resin. In Table I are summarized operations carried out in accordance with the present invention under varying conditions. The characteristics of the resin product are also listed.

prises admixing a polymer obtained by contacting turpentine with a Friedel-Crafts catalyst with a fraction of pyrogenous hydrocarbon condensate containing benzoid polymerizable monomers comprising a mixture of indene and coumarone, maintaining the mixture in the presence of boron trifluoride at a temperature below about 100° C. for a sufficient length of time to effect copolymerization of the polymer with the benzoid polymerizable monomers contained in the fraction of pyrogenous hydrocarbon condensate, and recovering the resultant copolymer.

*Table I*

| | First stage polymerization of turpentine | | | | Second stage copolymerization of turpentine polymer with Hi-Flash | | | | Percent yield resin based on terpene and indene coumarone monomers | Resin product | | | |
|---|---|---|---|---|---|---|---|---|---|---|---|---|---|
| Run No. | Batch or continuous [1] | Temperature, ° C. | Solvent | Catalyst | Batch or continuous [1] | Temperature, ° C. | Catalyst | Ratio of lbs. terpene to lbs. indene coumarone | | Color | Melting point, ° C. R.&B. | Mineral solubility, ° C. | Sensation of tack |
| 1 | Continuous | 90–100 | | BF$_3$ | Batch | 50 | BF$_3$ | 0.613:1.0 | 71 | C-3 | 113 | 67 | Acceptable. |
| 2 | Batch | 40 | | BF$_3$ | do | 50 | BF$_3$ | 0.0933:1.0 | 91 | C-3 | 112 | 98 | None. |
| 3 | Continuous | 0–10 | Toluene | BF$_3$ | Continuous | 30 | BF$_3$ | 1.64:1 | 76 | C-3 | 111 | 96 | Acceptable. |
| 4 | do | 0–10 | do | BF$_3$ | do | 50 | BF$_3$ | 1.96:1 | 85 | C-2½ | 110 | 81 | Do. |
| 5 | do | 0–10 | do | BF$_3$ | Batch | 50 | BF$_3$ | 1.80:1 | 79 | C-½ | 108 | 80 | Do. |
| 6 | Batch | 0–10 | do | AlCl$_3$ | do | 30–40 | BF$_3$ | 2:1 | 75 | C-1½ | 132 | 139 | Do. |
| 7 | do | 0–5 | do | AlCl$_3$ | do | 40–50 | BF$_3$ | 1.5:1 | 83 | C-3 | 109 | 110 | Do. |
| 8 | Continuous [2] | 90–100 | | BF$_3$ | do | 40–50 | BF$_3$ | 1.3:1 | 77 | C-2 | 107 | 92 | Do. |
| 9 | do | 90–100 | | BF$_3$ | do | 40–50 | BF$_3$ | 1.8:1 | 90 | C-2½ | 90 | 113 | Do. |

[1] In batch operation the reactants are polymerized in a kettle, agitated with a stirrer, and surrounded by a jacket through which coolant is passed to maintain the temperature of the contents. In continuous operation reactants are recirculated through a shell and tube reactor as described and illustrated in the drawing.
[2] First stage reaction was carried out by passing turpentine downwardly through a column maintained at 90–100° C. countercurrent to BF$_3$ gas introduced into the bottom of the column. Turpentine polymer was continuously withdrawn from the column.

Although certain preferred embodiments of the invention have been disclosed for purpose of illustration it will be evident that various changes and modifications may be made therein without departing from the scope and spirit of the invention.

We claim:

1. A process for the production of resin which comprises admixing a polymer obtained by contacting turpentine with a Friedel-Crafts catalyst with benzoid polymerizable monomers comprising a mixture of coumarone and indene, maintaining the mixture in the presence of a Friedel-Crafts catalyst for a sufficient length of time to effect copolymerization of the polymer with the benzoid polymerizable monomers, and recovering the resultant copolymer.

2. A process for the production of resin which comprises admixing a polymer obtained by contacting turpentine with a Friedel-Crafts catalyst with a fraction of pyrogenous hydrocarbon condensate containing benzoid polymerizable monomers comprising a mixture of indene and coumarone, maintaining the mixture in the presence of a Friedel-Crafts catalyst for a sufficient length of time to effect copolymerization of the polymer with the benzoid polymerizable monomers contained in the fraction of pyrogenous hydrocarbon condensate, and recovering the resultant copolymer.

3. A process for the production of resin which comprises admixing a polymer obtained by contacting turpentine with a Friedel-Crafts catalyst with a fraction of pyrogenous hydrocarbon condensate containing benzoid polymerizable monomers comprising a mixture of indene and coumarone, maintaining the mixture in the presence of boron trifluoride at a temperature below about 100° C. for a sufficient length of time to effect copolymerization of the polymer with the benzoid polymerizable monomers contained in the fraction of pyrogenous hydrocarbon condensate, and recovering the resultant copolymer.

4. A process for the production of resin which comprises admixing a polymer obtained by contacting turpentine with a Friedel-Crafts catalyst with a mixture of indene and coumarone monomers, maintaining the mixture in the presence of a Friedel-Crafts catalyst at a temperature below about 100° C. for a sufficient length of time to effect copolymerization of the polymer with the mixture of indene and coumarone monomers, and recovering the resultant copolymer.

5. A process for the production of resin which comprises admixing a polymer obtained by contacting turpentine with a Friedel-Crafts catalyst with a mixture of indene and coumarone monomers, maintaining the mixture in the presence of boron trifluoride at a temperature below about 100° C. for a sufficient length of time to effect copolymerization of the polymer with the mixture of indene and coumarone monomers, and recovering the resultant copolymer.

6. A resin produced by the process of claim 1.

References Cited in the file of this patent

UNITED STATES PATENTS

| | | |
|---|---|---|
| 1,697,275 | Gray | Jan. 1, 1929 |
| 2,287,535 | Powers | June 23, 1942 |
| 2,436,048 | Matthews | Feb. 17, 1948 |